S. HART.
Grain-Drills.
No. 144,452.　　　　　　　　Patented Nov. 11, 1873.
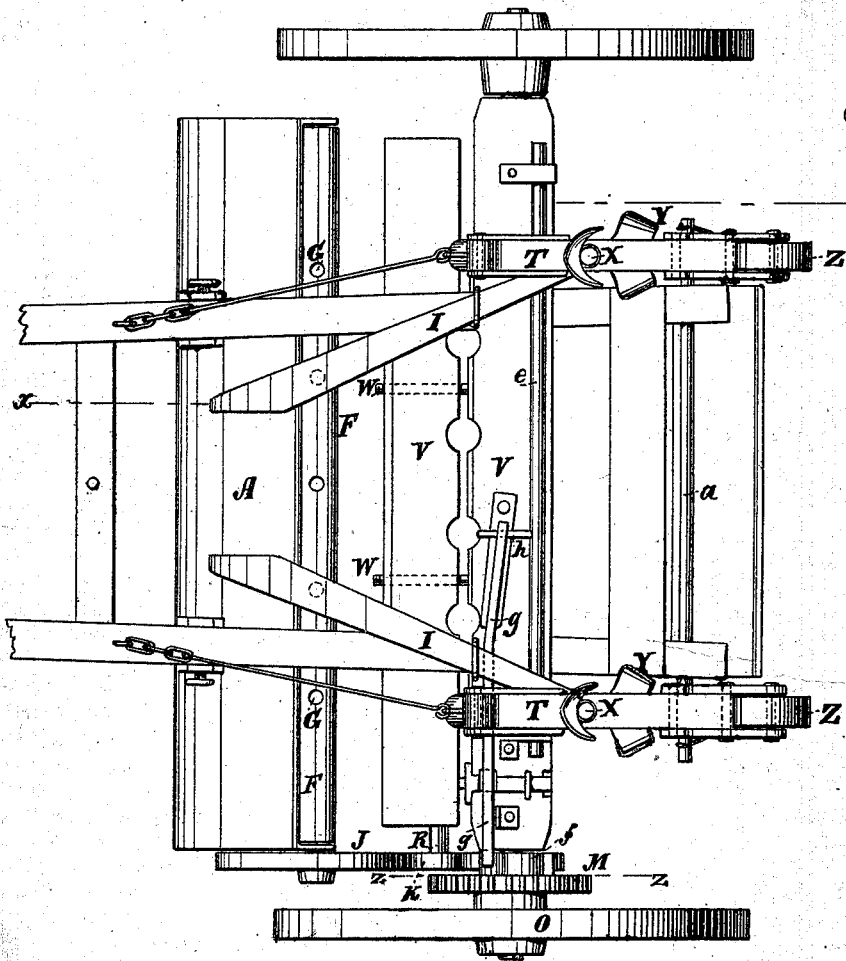
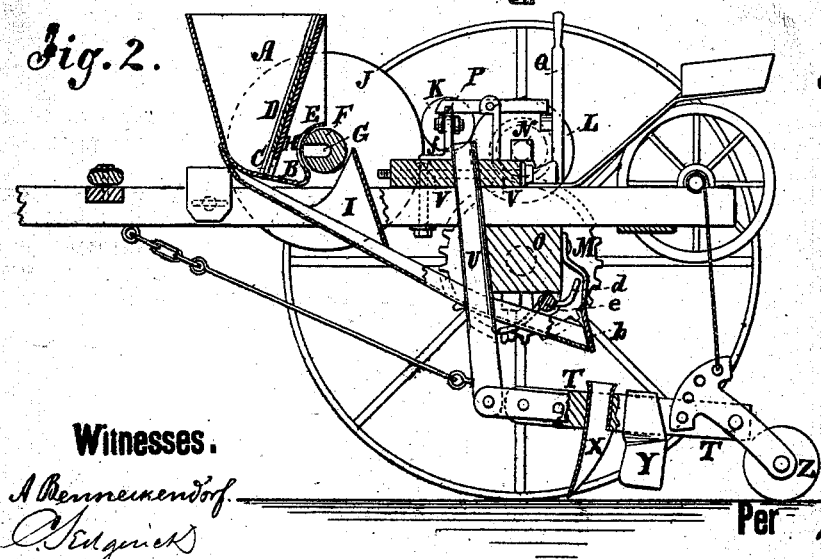
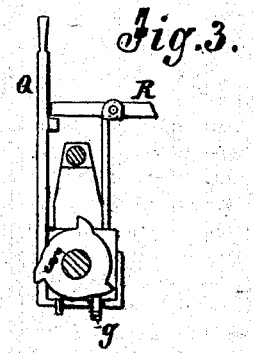
Witnesses:　　　　　　　　　　　　　　Inventor.

UNITED STATES PATENT OFFICE.

SAMUEL HART, OF FULTON, NEW YORK.

IMPROVEMENT IN GRAIN-DRILLS.

Specification forming part of Letters Patent No. 144,452, dated November 11, 1873; application filed June 21, 1873.

*To all whom may it concern:*

Be it known that I, SAMUEL HART, of Fulton, in the county of Oswego and State of New York, have invented a new and Improved Grain-Drill, of which the following is a specification:

The invention consists in the improvement of seed-sowers, as hereinafter described and pointed out in the claim.

Figure 1 is a plan view of my improved machine inverted. Fig. 2 is a longitudinal sectional elevation of it taken on the line $x\ x$ of Fig. 1. Fig. 3 is a detail section taken on the line $z\ z$ of Fig. 1.

Similar letters of reference indicate corresponding parts.

A represents a long grain-hopper, extending across the front portion of the machine, with a chamber, B, into which the grain escapes through the passage, which is regulated by a gate, D. The side E of this chamber is made to fit nearly half around a small dropping-roller, F, containing pockets G, opposite which there are slots H in the side E, through which the grain passes into the pockets. The roller has as many pockets as there are to be drills in the machine, and each pocket discharges into a spout, I, for sowing in drills. The roller is operated by the train of friction-wheels J, K, and L, and the gears M and N, which are turned by the truck-wheel O. The wheel K is on rod P, which swings up and down to throw the dropper-roller out of gear while turning at the sides of the field, and connecting it again. It is held in gear by the levers Q and R.

To vary the feed to sow more or less grain to a given breadth, the opening C is varied by the gate D; and, in case it is required to make a material variation, the friction-wheels can be changed and different sizes used.

T represents the drill-stocks. They are pivoted to a vertical rod, U, extending up between the clamping-bars V, which have suitable concave notches to hold them fast by being bound against them by the bolts W and nuts, which allow of releasing them readily to adjust them higher or lower; also, to take them out altogether, and put them in. These drill-stocks carry the usual drill-opening tubes X, covering-scrapers Y, and pressing-rollers Z, and they are connected to a rod, $a$, by cords, to raise them up out of the ground. The dropping-spouts terminate over the drill-tubes, and have, when the machine is to be used for planting, a gate or valve, $b$, closing against the lower end by a spring-shank, to retain the grain until it should fall into the hill. They are opened by arms $d$ on a rock-shaft, $e$, which is turned at the proper time by the tappet-wheel $f$, lever $g$, and arm $h$. The tappet-wheel has three tappets, and opens the valves three times to the revolution of the truck-wheels; but others with two tappets may be employed, if it be desirable to plant the hills farther apart.

Having thus described my invention, what I claim as new, and desire to secure by Letters Patent, is—

The combination of hopper A, provided with rotary feed-tube F, subjacent receptacles I, having trough closed by an automatically-opened valve, $b$, and the hollow opening plow X, arranged substantially as and for the purpose described.

SAMUEL HART.

Witnesses:
EDWIN R. HUZZINS,
LIBERTY ARNOLD.